(12) United States Patent
LaForge

(10) Patent No.: US 8,448,894 B2
(45) Date of Patent: May 28, 2013

(54) METHOD AND APPARATUS FOR A MOBILE AERIAL SUSTAINED SOLAR POWER-PLANT

(76) Inventor: Stuart Park LaForge, Reno, NV (US)

( * ) Notice: Subject to any disclaimer, the term of this patent is extended or adjusted under 35 U.S.C. 154(b) by 767 days.

(21) Appl. No.: 12/455,241

(22) Filed: May 28, 2009

(65) Prior Publication Data
US 2009/0294576 A1    Dec. 3, 2009

Related U.S. Application Data

(60) Provisional application No. 61/056,456, filed on May 28, 2008.

(51) Int. Cl.
*B64B 1/02* (2006.01)
*B64B 1/06* (2006.01)

(52) U.S. Cl.
USPC .............................. 244/30; 244/24

(58) Field of Classification Search
USPC ................... 244/30, 24, 158.1–173.3
See application file for complete search history.

(56) References Cited

U.S. PATENT DOCUMENTS

| | | | |
|---|---|---|---|
| 3,374,158 A | 3/1968 | Lord et al. | |
| 4,361,295 A | 11/1982 | Wenzel | |
| 4,364,532 A * | 12/1982 | Stark | 244/30 |
| 4,415,759 A * | 11/1983 | Copeland et al. | 244/172.8 |
| 4,534,525 A | 8/1985 | Bliamptis | |
| 5,019,768 A * | 5/1991 | Criswell et al. | 244/172.8 |
| 5,348,254 A * | 9/1994 | Nakada | 244/30 |
| 5,890,676 A | 4/1999 | Coleman et al. | |
| 6,224,016 B1 * | 5/2001 | Lee et al. | 244/30 |
| 6,461,752 B1 | 10/2002 | Leung | |
| 6,908,702 B2 * | 6/2005 | McElroy et al. | 244/30 |
| 6,919,847 B2 | 7/2005 | Caplan et al. | |
| 6,966,523 B2 | 11/2005 | Colting | |
| 7,073,749 B2 * | 7/2006 | Krill et al. | 244/2 |
| 7,179,677 B2 | 2/2007 | Ramanathan et al. | |
| 7,249,733 B2 | 7/2007 | Palmer | |
| 8,020,805 B2 * | 9/2011 | Choi et al. | 244/30 |
| 2002/0005457 A1 * | 1/2002 | Lee et al. | 244/30 |
| 2008/0272233 A1 * | 11/2008 | Marlin | 244/30 |
| 2009/0072078 A1 * | 3/2009 | Choi et al. | 244/30 |
| 2009/0272841 A1 * | 11/2009 | Sinsabaugh et al. | 244/30 |

* cited by examiner

*Primary Examiner* — Tien Dinh
*Assistant Examiner* — Steven Hawk

(57) ABSTRACT

The mobile aerial sustained solar power-plant (MASP) provides an improved method and device for the highly efficient collection, storage, transport, and wireless delivery of renewable energy from an airborne platform. This energy can be used to supply electrical power to clients or be used to power directed energy weapons.

5 Claims, 9 Drawing Sheets

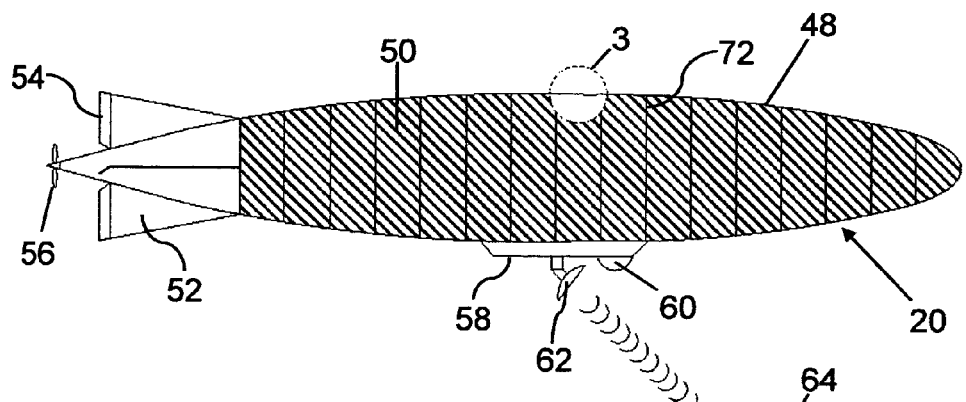
Fig. 2
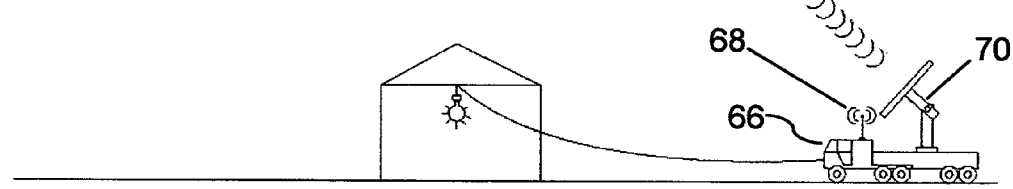
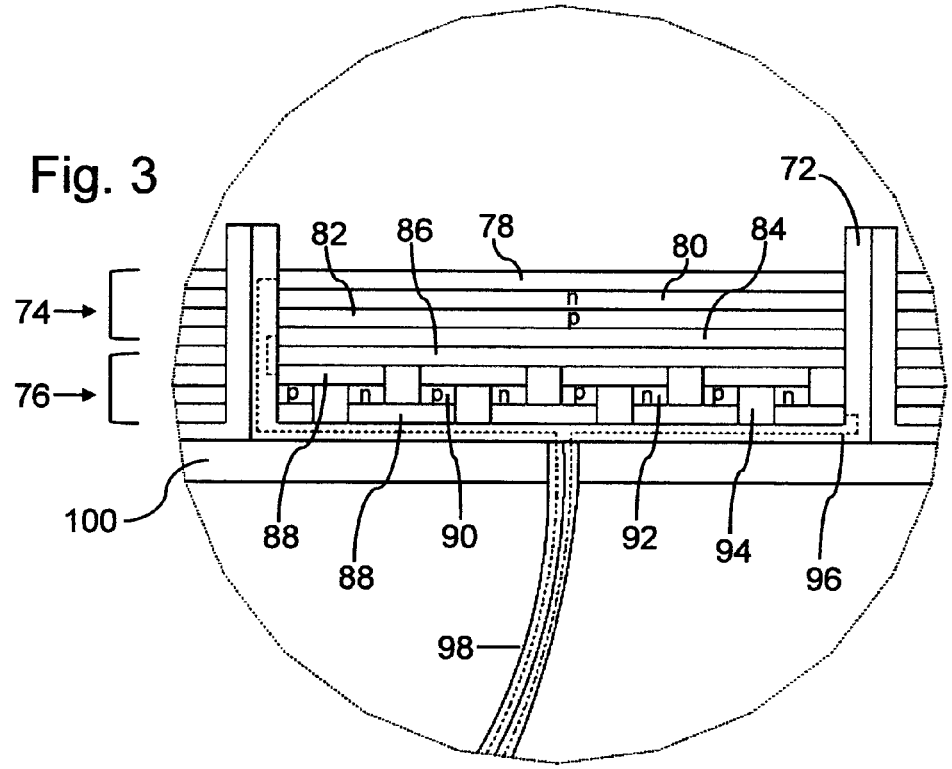
Fig. 3

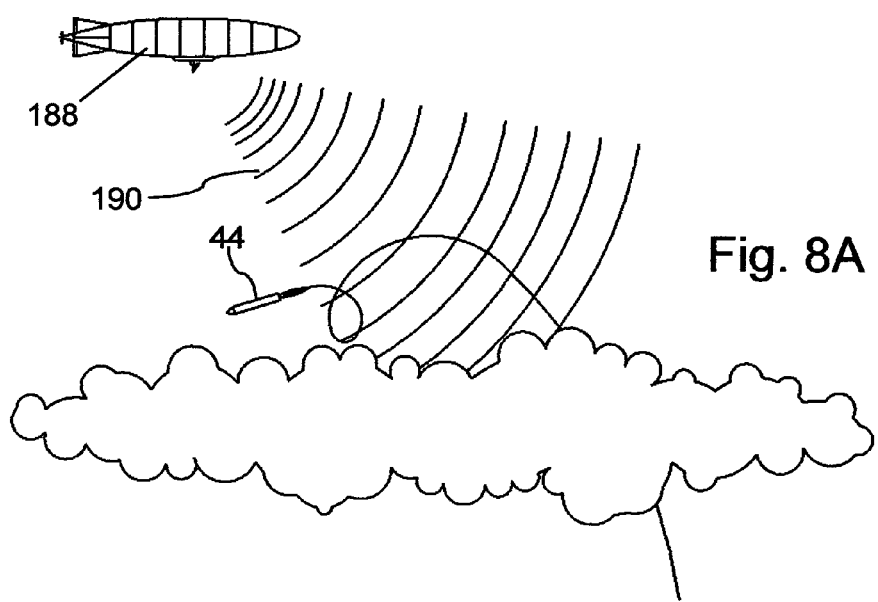
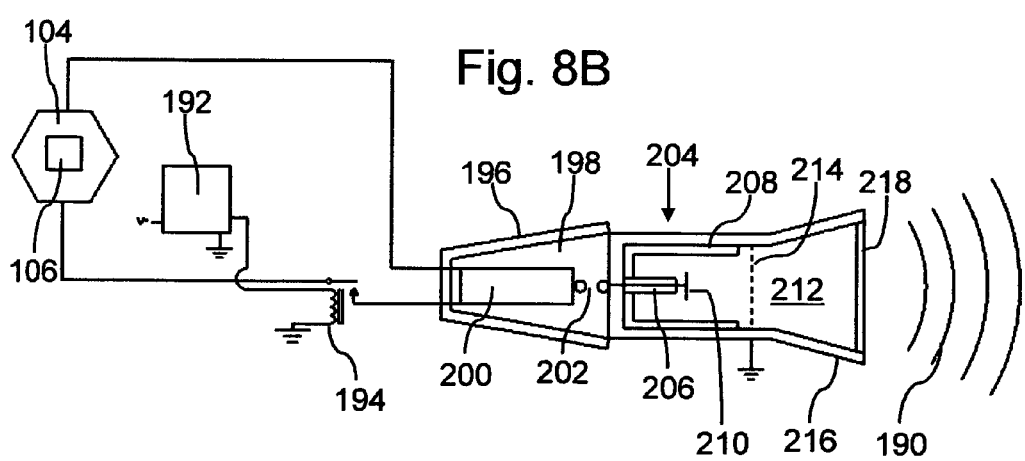

METHOD AND APPARATUS FOR A MOBILE AERIAL SUSTAINED SOLAR POWER-PLANT

CROSS-REFERENCE TO RELATED APPLICATIONS

This application claims the benefit of provisional patent application Ser. No. 61/056,456, filed 2008 May 28 by the present inventor.

FEDERALLY SPONSORED RESEARCH

Not Applicable

SEQUENCE LISTING OR PROGRAM

Not Applicable

BACKGROUND

1. Field of Invention

This application relates to the field of renewable energy generation and distribution by flying solar power-plants.

2. Prior Art

Rising fuel costs, dangerous reliance on foreign oil, and increasing rarity of new oil reserves have created an urgent demand for renewable energy technologies. One promising candidate is solar energy. A major drawback of ground-based solar energy farms, however, is that they are dependent to a large extent on the weather and climatic considerations. Geographical regions prone to frequent cloud cover experience less solar radiative flux due to the albedo of the clouds reflecting solar energy back into space. This coupled with the absorption of ultraviolet light by the ozone layer make ground-based solar power generation suboptimal for many locales.

Unfortunately for dense urban areas, where the need for electrical power is greater, real estate for the large number solar panels needed for megawatt level power generation is often unavailable or expensive making ground-based solar power stations impractical for cities. This problem is exacerbated in cities located on islands or other isolated locations where most of the electricity is generated using imported fossil fuels.

Cities are also vulnerable to rolling blackouts during hot summer months and other disruptions to their power supply. This is especially true in the wake of natural disasters such as hurricanes and earthquakes. Such disasters typically disrupt the local power grid sometimes for weeks at a time. This severely hampers emergency response and disaster recovery operations. When coupled with road closures and other obstacles to the importation of generators and fuel into the area, costs of such operations escalate.

Similarly modern military operations in remote locales where a power grid is unavailable often need a large electrical power source to operate their instruments and equipment. Heretofore such operations required the hauling of heavy generators along with large quantities of fuel at high cost. In the case of recent wars, this involved fuel convoys that were frequently vulnerable to attack by ambush or improvised explosive devices even by technologically inferior forces.

In addition to these considerations, it is commonly known that the military has been developing directed energy weapons, electromagnetic rail guns, and other energy-intensive ordnance. The development of these new weapons system has been hampered by their large mass and relatively high energy requirements. This has limited the mobility of such weapon systems and made them expensive to operate. Therefore there is a clearly a need for large mobile solar power-plants that are able to fly anywhere, carry massive payloads, and deliver megawatt levels of electrical power.

There are very few pertinent references in the prior art as aerial alternative energy power beaming is a relatively new field where the necessary technology has only recently started to mature. The earliest reference to a related device was in U.S. Pat. No. 4,364,532 filed in 1979 by Stark who claimed a device called a balloon power station (BPS). Stark's BPS collected solar energy and used microwaves to transmit the power to the ground. While visionary for its time, Stark's BPS did not claim a method to store energy. Therefore Stark's BPS would be inoperable at night or under cloud cover.

Another related invention was in U.S. Pat. No. 4,534,525 filed in 1983 by Bliamptis. Bliamptis' invention was a vacuum balloon that performed essentially same function as Stark's BPS. It also suffered from the limitation that it did not have any means of storing energy. This is a serious limitation in a modern world that operates around the clock with wars and natural disasters that do not wait for sunny days. It is therefore the aim of the mobile aerial sustained solar power-plant to overcome this limitation as well as introduce some novel features that should boost the utility, efficiency, and overall practicality of aerial alternative energy power beaming.

SUMMARY

The mobile aerial sustained solar power-plant (MASP) provides an improved method for the collection and wireless delivery of renewable energy from an airborne platform. This energy can be used to supply electrical power to clients or used to power directed energy weapons.

The major improvement lay in its energy storage capabilities which are based on the use of multiple fuel cells in conjunction with the solar-driven electrolysis of water to form a buffered energy cycle. In this buffered cycle, hydrogen is extracted from water and stored for later use in the fuel cells.

When the hydrogen is later recombined with oxygen in the fuel cells, the energy is recovered and the water is reformed, ready to be used again. The energy buffering allows for control of the amount of power supplied including a boost mode wherein many hours worth of stored energy can be expended in short very high-powered bursts.

BRIEF DESCRIPTION OF THE DRAWINGS

The advantages of the mobile aerial sustained solar power-plant are best appreciated with reference to the following drawings:

FIG. 2 is a simplified representation of one possible embodiment of the present invention supplying power to a client.

FIG. 3 is a greatly magnified cutaway view of the solar collector displayed in FIG. 2.

FIG. 8A is a simplified representation of a high altitude embodiment of the present invention disrupting a target missile with an electromagnetic pulse.

FIG. 8B is a simplified schematic of an embodiment of the electromagnetic pulse weapon from the previous figure.

DETAILED DESCRIPTION OF THE DRAWINGS

FIG. 1A

Figure 1A:
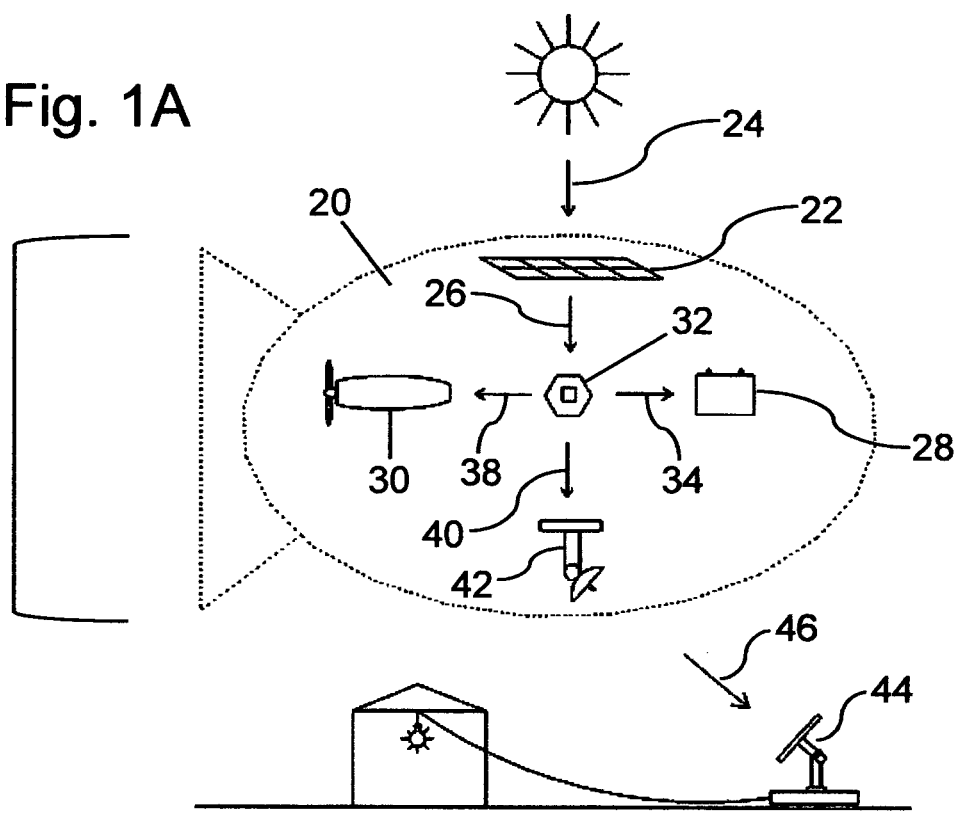
FIGS. 1A & 1B are diagrams that summarize the present invention in its broadest form.

In FIG. 1A, we see a MASP with component airship 20 under a depiction of the sun. Solar radiation 24 strikes a collector 22 and is converted to electricity 26. A switching circuit 32 apportions a first measure of electricity 38 to a propulsion system 30, a second measure of electricity 34 to a storage system 28, and a third measure of the electricity 40 to a transmitter 42. The transmitter 42 converts and transmits the electricity as an electromagnetic beam 46 to a target 44. If the target is a rectifying antenna or similar device, the electromagnetic beam can be reconverted into useful electricity depicted by the house with the lit light bulb.

FIG. 1B

Figure 1B:
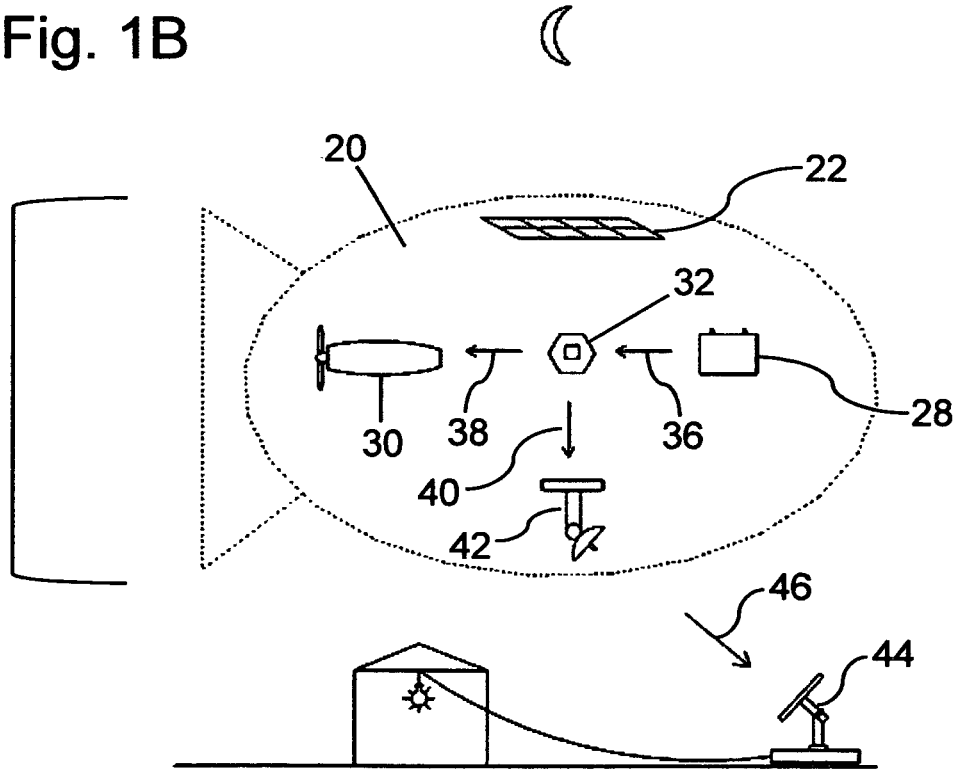

In FIG. 1B, we have the MASP with component airship 20 at night. The collector 22 is inoperable and so it is the storage system 28 that is the primary energy source. Electricity 36 is recovered from storage 28 and flows to the switching circuit 32. The switching circuit 32 then routes some of the electricity 38 to the propulsion system 30 and some of the electricity 40 to the transmitter 42. The transmitter 42 converts and transmits the energy as an electromagnetic beam 46 to a target 44.

This scheme while seemingly simple actually allows for quite a bit of flexibility depending on the mission status of the MASP. For example, if the MASP is in transit and speed is of the essence, the switching circuit 32 can route most of the power to the propulsion system 20. If there is time, it can take it slower and recharge its storage system 28 while daylight permits. If it is already on station with plenty of stored energy, the switching circuit 32 can route most of the electricity 40 to the transmitter 42.

If there is a wind blowing, the switching circuit 32 can route some power to the propulsion system 30 for station keeping. It can do so either at a steady rate to match wind velocity or alternatively it can allow itself to drift downwind while panning its transmitter 42 to stay on target and engage its propulsion system 30 in short bursts to play "catch up". Similarly, if the MASP is on a long mission and has depleted its energy reserves through a busy night, it can transmit half its power and store the other half for the ensuing night. Between missions, the MASP can use minimal power and stockpile solar energy.

FIG. 2

Turning now to FIG. 2, a simplified representation of one possible embodiment of the MASP in shown in action from profile. The component airship 20 has stabilizers 52 in the rear with control surfaces 54, a propeller 56 connected to an electric motor (not shown) representative of one or more such motors making up a propulsions system 30. A component airship 20 is covered with thin-film photovoltaics 48 arranged in ring modules 50 around the circumference of the ship. Between the ring modules lie heat sinks 72 that likewise go around the circumference of the component airship 20 in a ring-like fashion. On the underside of the airship, there is a gondola 58 that has a standard phased array 60 for radar purposes and a directional propagating antenna 62 for power beaming. The propagating antenna 62 is emitting a microwave beam 64 down to a mobile platform 66 that is equipped with a transponder beacon 68 and a rectifying antenna 70. Finally there is a circular cutaway 3 of the upper surface of a ring module 50 that will be the topic of FIG. 3.

At this point it may help to point out that a MASP is not simply another solar-powered airship. There are some major differences in being a power-plant and being a method of transportation or a surveillance platform and that have ramifications for the design and implementation. The airship 20 is merely one of the several components to the MASP that operate in synergy to make the invention function and not the invention itself. It merely serves as a means for carrying aloft and moving the collector 22, storage system 28, and transmitter 42 which constitute the true essence of the present invention.

One readily apparent difference from prior art solar-powered airships, even those of the newer high altitude variety, is that such airships have relatively small solar panels that run longitudinally along the upper surface of the airship. Contrary to such, the present embodiment of the MASP instead has ring modules 50 arranged in a vertical banded pattern along nearly its entire length that give the switching circuit 32 convenient units of power to distribute to the various systems of the power-plant throughout the day. This is because the sun will be at roughly the same elevation to all of them at any given time.

Furthermore most of the prior art devices have solar concentrators or some mechanism to do slow barrel rolls to keep their small solar panels in the direct sunlight. The MASP however, doesn't waste precious space and disposable lift on concentrators or the like. Instead, it takes advantage of the lightness and cheapness of the newest generation of thin-film solar technology like CIGS to institute a shotgun approach to solar collection. All practical surfaces that could potentially receive direct or reflected sunshine are covered with very lightweight, flexible, and cheap solar panels.

Due to the natural phenomenon of albedo or the reflection of sunlight by the ground, clouds, and other planetary features, it makes sense to cover even the lower surfaces of the MASP with thin-film solar panels. This is because a MASP flying over white clouds or a patch of white snow will harvest on average 100 watts per square meter of such sunlight from its underside. A simple consideration of the number of downhill skiers who experience sunburn to their faces should convince one of the truth of this phenomenon. Also placing a large mirror on the ground beneath a MASP near the rectenna site would nearly double its power output. The MASP is not designed to harvest just the optimal sunlight but instead to harvest all the sunlight that it can, regardless of quality.

FIG. 3

In FIG. 3 a cutaway close up of a ring module 50 from FIG. 2 is shown with a large exaggeration of the vertical dimension. Here we have an airship gore 100 with a large but thin heat sink 72 that is representative of many such. The heat sink 72 also serves as a wrap-around bracket to hold in place a photovoltaic layer 74 and a thermoelectric layer 76. The top element of the photovoltaic layer 74 is a transparent front contact 78 of tin oxide beneath which is an n-type semiconductor film 80 of cadmium sulfide. Moving further down we have the p-type semiconductor film 82 of copper indium gallium selenide (CIGS) and a back contact 84 of molybdenum. The photovoltaic layer 74 is mounted on a substrate 86 that is composed of a heat conductive dielectric that separates it and the thermoelectric layer 76. Beneath the substrate 86, is a series of conductive foil tabs 88 that electrically connect p-type antimony telluride micropellets 90 to n-type bismuth telluride micropellets 92 in series alternating on top and bottom with microscopic air channels 94 separating the micropellets 90 & 92. The photovoltaic layer 74 is connected in electrical series with thermoelectric layer 76 via fine conductive wires 96 that snake through the heat sink 72 at key points finally terminating in larger wires that enter the MASP through the gore 100.

The heat sink 72 looked at in isolation from the front would resemble a large thin bicycle rim with small air flow fins (not shown) at small regular intervals around the outside perimeter that thin enough and numerous enough to give adequate cooling surface area but not so high as to cast an appreciable shadow over the collection surface. It is preferred that the heat sink 72 be composed of a thermally-conductive dielectric similar to the substrate 86. Due to weight considerations, a good candidate for both would be a plastic polymer like Cool Poly® a proprietary compound produced by Cool Polymers, Inc. of 333 Strawberry Field Road in Warwick, R.I. Should this not be convenient, then the heat sink 72 can be made of aluminum but in such a circumstance, the thin film layers must be kept electrically separate from the heat sink 72 by a thin coating of an insulator and the fine conductive wires 96 must be insulated as well.

The advantage of this configuration for the collector over the prior art is that typically large solar panels of photovoltaic cells heat up when in operation. The heat increases the resistance of the solar panel and thereby lowers the conversion efficiency. This configuration solves that problem by linking the solar panels in electrical series and thermal parallel to thin-film thermoelectric generators. This utilizes the Seebeck effect to generate electricity from the heat to compensate for this increase in resistance in the solar panels and at the same time conducts heat away from the solar panels.

FIG. 4

Figure 4:
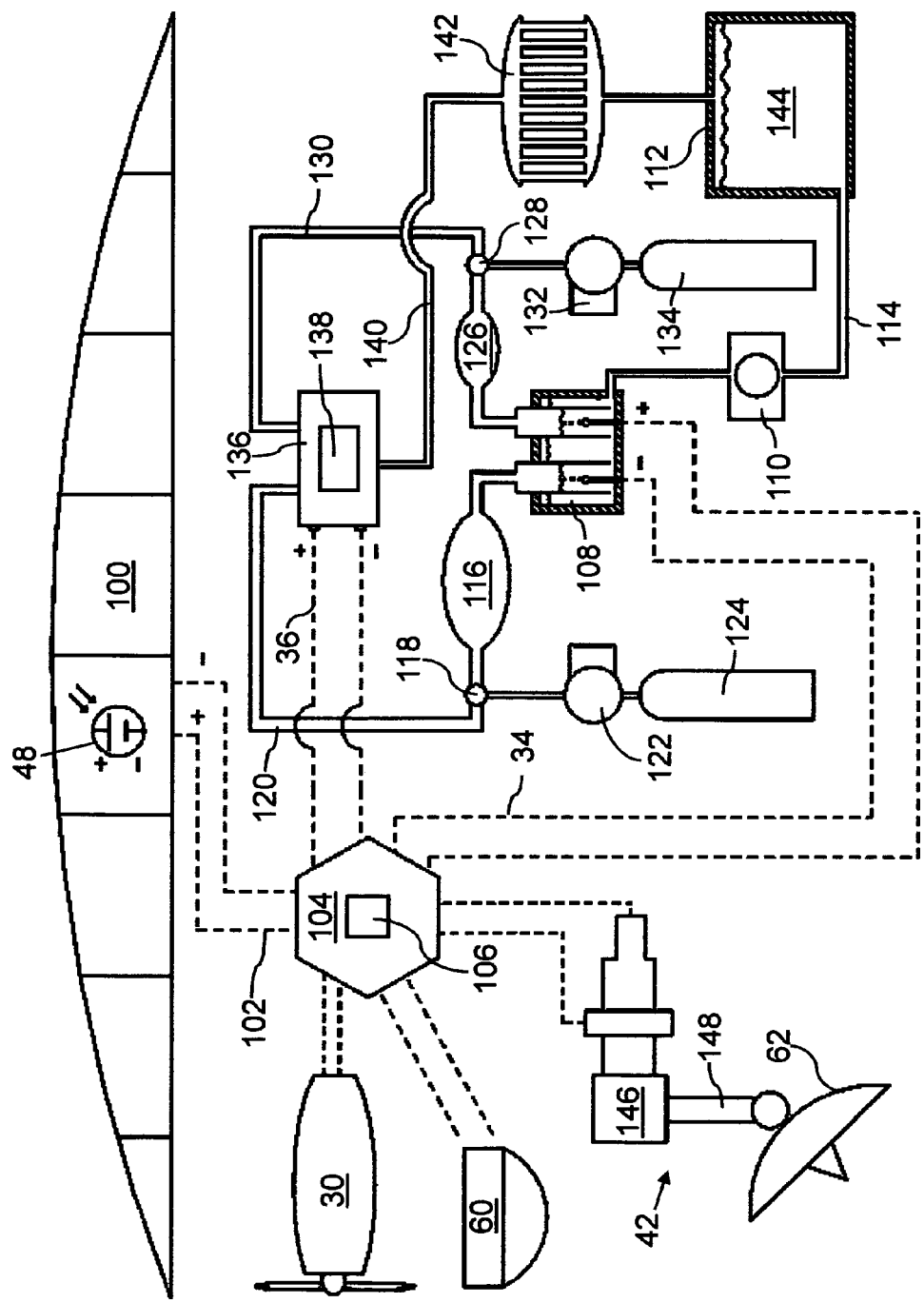
FIG. 4 is a simplified schematic representation of one possible embodiment of the solar energy storage, retrieval, and delivery system.

In FIG. 4, we take a look inside at the internal power storage, retrieval, and delivery systems of the MASP. They comprise the following components: a microprocessor-controlled 106 power hub 104 that connects the major operational systems such as the propulsion system 30, phased array radar 60, and the transmitter 42 to thin-film photovoltaics 48 on the gore 100. An energy storage circuit 34, and an energy recovery circuit 36 run through a series of electrical conduits 102. The transmitter 42 in this particular embodiment is itself comprised of a gyrotron 146, mode converter 148, and a directional propagating antenna 62.

Sunlight striking the thin-film photovoltaics 48 generate electricity which enters the energy storage circuit 34 which in turn powers an electrolysis cell 108 supplied with water 144 by a water reservoir 112 and a water pump 110 all connected by a water conduit 114. The electrolysis cell 108 breaks down the water 144 into hydrogen and oxygen. Over time, the hydrogen collects in a hydrogen collection chamber 116 until a hydrogen compressor 122 is engaged at which point an electromechanically actuated L-shaped ball valve 118 opens and allows the hydrogen to flow into the compressor 122 and be compressed into a hydrogen storage container 124. A similar process occurs with the oxygen which collects in the oxygen collection chamber 126 until an electromechanically actuated L-shaped ball valve for oxygen 128 allows passage of the oxygen into the oxygen compressor 132 where it is compressed for storage in the oxygen storage container 134.

The energy is thus stored until such time as a proton exchange membrane (PEM) fuel cell stack 136 is turned on at which point the electromechanically actuated L-shaped ball valve for hydrogen 118 and the electromechanically actuated L-shaped ball valve for oxygen 128 open. This allows a regulated flow rate of each gas through a hydrogen conduit 120 and an oxygen conduit 130 into the fuel cell stack 136 which chemically recombines them into water vapor which flows via a steam conduit 140 to a radiator 142 where it is condensed into liquid water 144 which flows back into the water reservoir 112. In this process, the fuel cells 138 liberate the stored energy as electricity which flows back into the power hub 106 through circuit 34. The fuel cells 136 also generate heat. The heat released by the fuel cell stack 132 is transformed into usable electricity by one or more thermoelectric cogenerators 138 that also return energy to the power hub 106.

It has probably occurred to those with skill in the art that the above mechanism results in an energy cycle that could, barring routine maintenance, be carried on nearly indefinitely allowing the MASP to store impressive amounts of solar energy by day for transmission at night for months at a time. Since one of the aims of the MASP is to maximize the capacity to collect and store solar energy in excess of the energy requirements of the component airship 20, some of the components shown, such as the fuel cells 136, hydrogen storage containers 124, and thermoelectric generators 138 should be considered modular. That is to say that the MASP should carry as many of them as it can so as to increase its ability to generate and store energy. The thermoelectric generators 138 should be used liberally not just in conjunction with the fuel cells 136 but with all the components of the MASP that generate heat in the course of operation such as the electrolysis cell 108, the propulsion system 30, and the gyrotron 146. This will make the MASP more efficient at generating electricity for storage and delivery.

The choice of the gyrotron 146 for a microwave source is due to many advantages of gyrotrons over other sources. For one thing, it is considered a form of high-powered maser such that the beam that emanates from it is coherent and of a single frequency. With minor adjustments known to those with skill in the art, the microwave beam that emanates from a gyrotron can be fashioned into a guassian beam or a narrow one that does not spread out a lot the further it gets from the source. This has the effect of keeping the energy of the beam concentrated such that a smaller rectifying antenna (rectenna) can be used to collect energy from it. This helps keep costs down both in terms of the materials involved in constructing a rectenna and in energy lost through spreading of the beam beyond the borders of the rectenna. It also makes the beam more accurate and lowers the chance that an unintentional target will be struck by the edges of such a beam. It has also been shown capable and efficient at power beaming in the prior art with efficiencies at 50% and higher.

The frequency of microwaves to use for the power beam are a compromise between two considerations: the effective range due to atmospheric attenuation and the ultimate spot size at the destination or beam cross section. The higher the frequency used, the smaller the spot size and therefore the rectenna needed. The lower the frequency used, the less atmospheric attenuation saps the energy of the beam before it reaches the rectenna. In consideration of these factors, 95 GHz is a good median choice. It has the added benefit of having a built in safety feature. Anyone who ventures advertently into the edges of the beam path will feel intense pain but not be otherwise harmed. This will give them ample warning to not proceed into the center of the beam where the most power is concentrated and more serious damage could be done. A lower frequency beam would not have this warning feature and such a person could suffer serious internal injury before they noticed anything was amiss.

Figure 5:
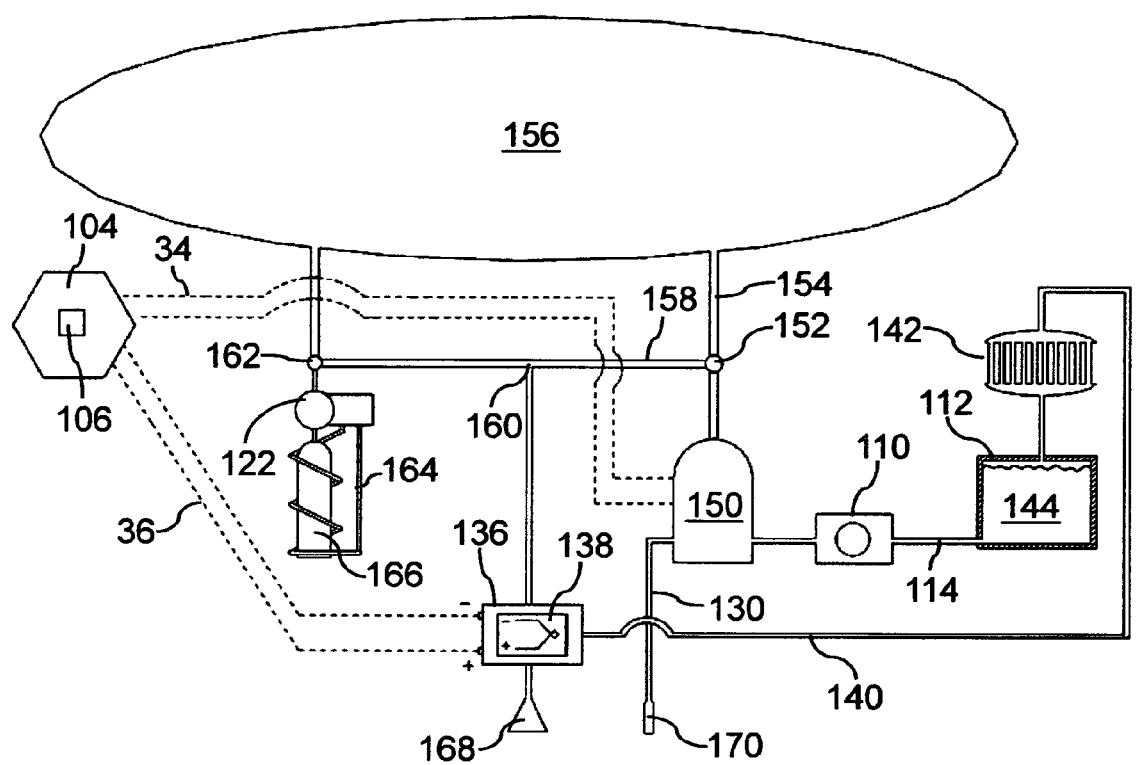
FIG. 5 is a simplified schematic representation of an alternative embodiment of the energy storage and retrieval system.

With regard to hydrogen storage, the reader should note that due to hydrogen embrittlement, all the conduits carrying hydrogen should be of hydrogen resistant materials that are light in weight. Carbon-fiber-coated polymers spring to mind as a good candidate due to their strength, weight, and resistance to hydrogen seepage. Aluminum would also be a fair choice. There are also several good hydrogen storage containers on the market and in the prior art that can be used. An advantage of this embodiment of the storage system is that it can work with existing helium airships which are probably considered standard by those with skill in the art of airships.
FIG. 5

In FIG. 5 we have an alternative embodiment of the energy storage system of the MASP that is in many respects superior to the one disclosed in FIG. 4. There are some basic similarities like the microprocessor-controlled 106 power hub 104 connected to the proton exchange membrane fuel cell stack 136 and thermoelectric cogenerator 138 via a recovery circuit 36. But there are crucial differences. Although it also bears a water pump 110 that pumps water 144 from the water reservoir 112 through a water conduit 114, the water 144 is pumped at a much higher pressure than in the previous embodiment to a high-pressure electrolysis cell 150 that uses a proton exchange membrane similar to a fuel cell operating in reverse to break down water 144 into hydrogen and oxygen using an electrical current delivered via the storage circuit 34. The high-pressure electrolysis cell 150 serves to save energy by pre-pressurizing the hydrogen, saving the energy cost of hydrogen compression for short term hydrogen storage. Unlike the previous embodiment, the oxygen is not stored but is instead vented into the atmosphere via oxygen conduit 130 and the oxygen exhaust port 170, saving weight and reducing the fire hazard.

The hydrogen however goes to a first electromechanically-actuated T-shaped ball valve 152 where, depending on which way the valve stem is set, will shunt the hydrogen either of two directions. The first direction leads by the first hydrogen conduit 154 to the gas envelope 156, where the hydrogen acts as the lift gas and simultaneously the gas envelope 156 acts as a giant hydrogen fuel reservoir. Or instead it can direct the hydrogen through a second hydrogen conduit 158 to a T-connector 160.

The T-connector 160 leads in one direction to the proton exchange membrane fuel cell stack 136. Here the hydrogen can be recombined with atmospheric air from an air intake manifold 168 containing a blower and a dessicant (not shown) to dry and pressurize the air for the fuel cell stack 168. This will, as in the previous embodiment, produce electricity, heat and water vapor that then is routed to the radiator 142 via the steam conduit 140 to be condensed back to water 144 in the water reservoir 112.

The second direction from the T-connector 160 leads to the second electromechanically actuated T-shaped ball valve 162 that directs the flow of hydrogen in and out of the hydrogen compressor 122 and, hydrogen condenser 164 which together compress and liquefy the hydrogen gas for long term storage in the cryogenic liquid-hydrogen container 166. With the ball of the ball valve 162 in an alternate position, the compressor 122 and condenser 164 can draw out and liquefy hydrogen from the gas envelope 156 allowing excess hydrogen to be liquefied for long term gas storage and allows a separate means to reduce the buoyancy of the MASP from the ballonets (not shown) common in the prior art. This process is assumed to be reversible and a small heating-coil (not shown) should obviously be placed so that the liquid hydrogen can be warmed before being released into the gas envelope 156. As in the previous embodiment I would recommend the liberal use of thermoelectric generators on every heat producing component of the MASP.

Figure 6:
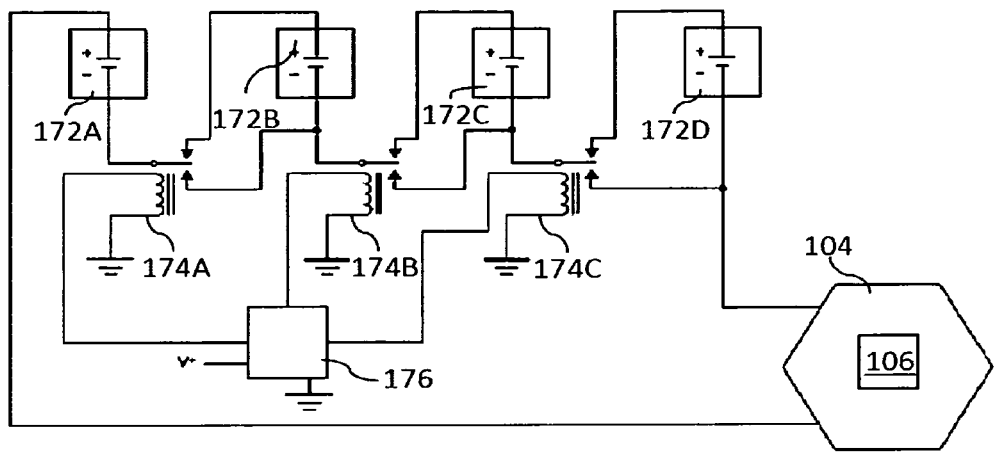
FIG. 6 is a schematic of a simple direct current power source reconfiguring circuit for the present invention.

Aside from the beautiful synergy of a device that is held aloft by the very same fuel it uses to drive itself and deliver power to others there is another advantage to this embodiment. The gas envelope of an airship is very large. The large World War I era zeppelins envelopes were of the order of 200,000 cubic meters. That constitutes a huge energy reserve for the MASP and allows the freer use of a special function, I call boost mode. In boost mode a MASP equipped with extra fuel cell stacks (not shown) can temporarily double or triple its power output for a short time by engaging the extra fuel cells and fueling them with hydrogen from the gas envelope 156. The amount of lift lost in a suitably large MASP due to this will not be appreciable and can easily be made up for when the power output returns to equilibrium mode. Boost mode can be used as an auxiliary power source for an extra boost of speed from the propulsion system 30 or to increase the output of the transmitter 42. The disadvantage of all that hydrogen on board is of course fire and explosion. There are ways however to mitigate this risk for example by using brushless DC motors for the propulsion system 30. There are other ways to mitigate risk of fire that are beyond the scope of this document.
FIG. 6

In FIG. 6 the power hub 104 and microprocessor 106 draw power from a group of four identical direct current (DC) sources 172A-172D interconnected by a group of three double-pole relay switches 174A-174C that are independently actuated by a microcontroller 176.

Briefly the circuit is shown with all four DC sources 172A-172D in a series configuration by default. When all three relays 174A-174C are thrown by the microcontroller 176, the DC sources 172A-172D are now all in parallel. If however only relay 174A is thrown, then DC sources 172A and 172B are in parallel but the two together are in series with relays 174C and 174D which are also still in series with one another. With these four power sources, four unique power configurations are available. That is to say that four different voltages and current combinations are available.

Figure 7:
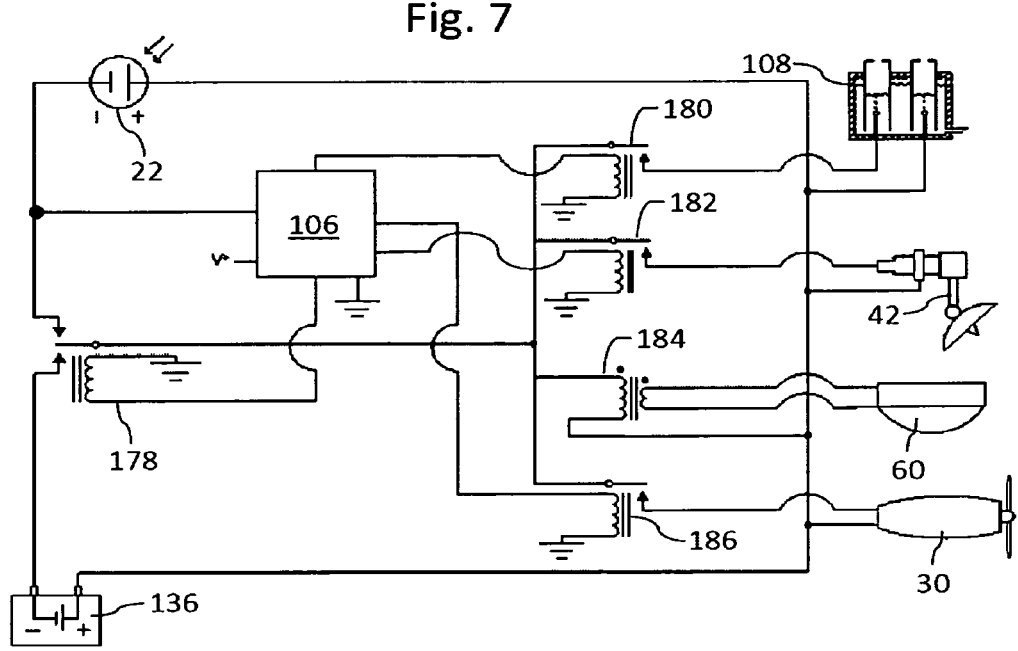
FIG. 7 is a simplified schematic of an embodiment of the power management system.

This circuit was conceived to deal with dynamically changing the voltage and current capacity of the ring modules 50 and fuel cells 136 in the MASP for different needs. For example power beaming requires high voltage and medium current whereas electrolysis only requires only a few volts but a large current. I thought such a circuit would be more efficient than having a system of inverters, transformers, and rectifiers to convert DC into AC to adjust the power configuration just to convert it back to DC for use. This is especially true when the configuration would need to be dynamic. Although it was designed for the MASP, the circuit is much more generally useful and might find any number of applications in electronics.
FIG. 7

In FIG. 7, we have an embodiment of the power hub 104 which is a component of the switching circuit 32. A double-pole high voltage primary contactor 178 switches either the collector 22 or the fuel cell stack 136 to power the rest of the circuit. The rest of the circuit includes the propulsion system 30 which is connected to either power source via a propulsion contactor 186, the transmitter 42 which is connected to either power source by a transmitter contactor 182, the electrolysis cell 108 which is connected to either power source an electrolysis contactor 180, and the phased array radar 60 which is supplied by alternating current from either power source via a power inverter 184. There is also a microprocessor 106 that controls the switching of the primary contactor 178, as well as contactors 180, 182, and 186.

This circuit schematic represents a highly simplified exemplary embodiment of the power hub 104. The primary contactor switches the powering of the entire circuit between the collector 22 and the fuel cell stack 136. Each of the other contactors controls its respective element except the phased array radar 60 which is wired such that it is always on so long as the MASP is online. This is a safety precaution to prevent mid-air collisions and other accidents. Also note that there are numerous electronic components and additional circuitry not shown in the interest of clarity but which one skilled in the art would ascertain such as an H-bridge circuit (not shown) and rheostat (not shown) to control the speed and direction of the electric motors (not shown) of the propulsion system.

FIG. 8A

Referring to FIG. 8A, we see a representation of a military embodiment of the MASP with a component high altitude airship 188 that has fired a high-powered electromagnetic pulse 190 at a target 44, which in this representation is depicted as a surface to air missile (SAM). The missile is no longer able to home in on the MASP due its guidance systems having been damaged by the electromagnetic pulse.

FIG. 8B

In FIG. 8B we have a simplified embodiment of an electromagnetic pulse generator for use as a directed energy weapon aboard a military embodiment of the MASP similar to one shown in FIG. 8A. It depicts the microprocessor—106—controlled power hub 104 connected to a trigger contactor 194 that is switched on by the targeting system 192. The contactor 194 closes the circuit leading to a Marx generator 200 that is enclosed in a sealed and pressurized insulated waveguide 196. The waveguide 196 is filled with a compressed inert gas that increases the resistance across an enclosed spark gap 202 that bridges the Marx generator 200 with an insulated transmission line 206 leading through front of the waveguide 196 to the rear of a vircator 204. The other end of the insulated transmission line 206 terminates in a cathode 210 that lies within a grounded metal casing 216 that surrounds an evacuated chamber 212 There is an anode 212 that is conductively connected to the metal casing 216 approximately halfway across the evacuated chamber from the cathode 210. The entire inner rear of the casing 216 up until just before the anode 212 is covered by insulation 208. The front of the vircator 204 is sealed by a window 218 made of a dielectric material through which the electromagnetic pulse 190 propagates.

The electromagnetic pulse (EMP) weapon described above is a significantly different form of microwave source than the gyrotron described earlier. The gyrotron produces a coherent microwave beam of a single frequency while the vircator produces a wide band of frequencies. It is this wide band property that makes it ideal for use as an EMP device. This is because the more different frequencies one can propagate toward a target, the more likely that one of the frequencies will penetrate the target and couple with the electronic components. While the continuous wave mode of operation of the power-beaming gyrotron 146 of a MASP allows it to simply be connected to the DC power hub 104 with little or no further power conditioning, the EMP generator needs to be used with pulsed power. This necessitates the use of a Marx generator as a pulse forming device. An 8-12 stage Marx generator 200 should more than adequately serve the purpose.

FIG. 9

Figure 9:
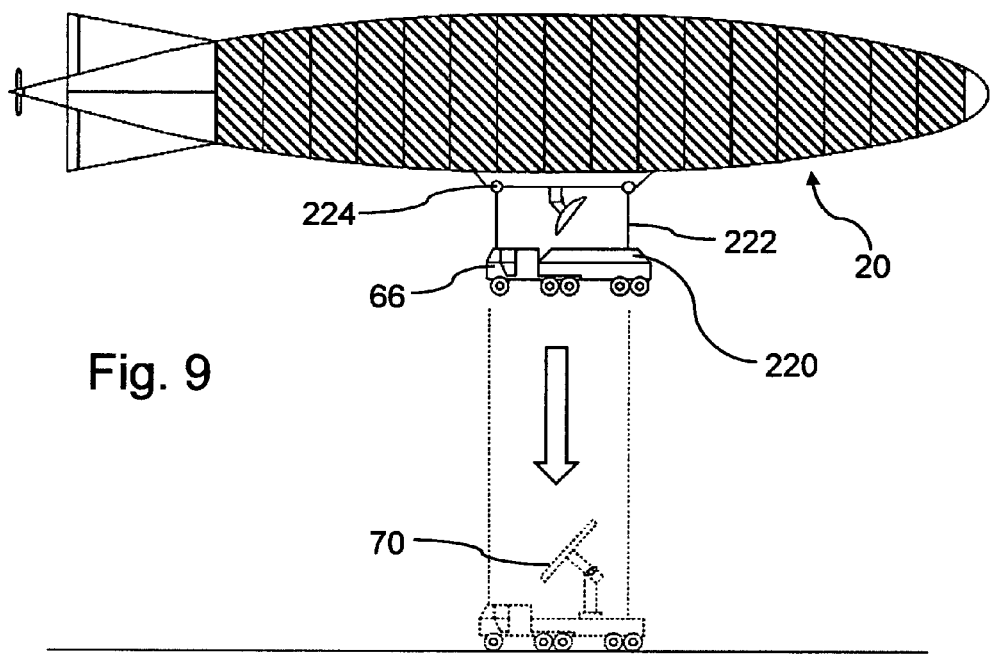
FIG. 9 is a simplified representation of a mobile aerial sustained solar power-plant airlifting its own rectifying antenna into position.

Turning now to FIG. 9 we have a highly simplified depiction of a MASP airlifting a rectifying antenna into position that it can subsequently use to beam power to a remote location perhaps otherwise inaccessible by the mobile platform 66 rectifying antenna 70. The component airship 20 is carrying a suspended mobile platform 66 with its rectifying antenna in a folded configuration 220. Upon being lowered to the ground on heavy-lifting cables 222 by electromechanical winches 224, the rectifying antenna 70 is unfolded and deployed for use.

In regards to FIG. 9, the cables and winches described are very standard and commercially available so they will not be belabored. One skilled in the art could easily ascertain how best to configure and affix them upon the weight-bearing frame of an airship. It is recommended to use four cables so as to maintain the load's balance during ascent and descent.

FIG. 10

Figure 10:
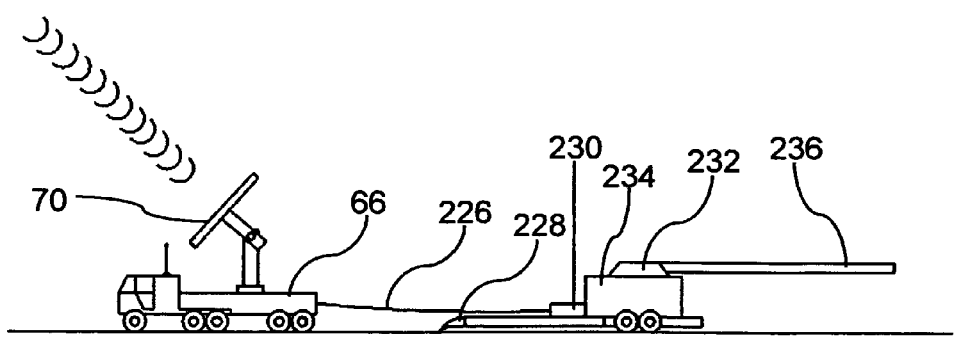
FIG. 10 is a simplified representation of an electromagnetic rail-gun powered by the present invention.

In FIG. 10, a MASP is shown powering a ground-based energy intensive weapon. The figure includes a mobile platform 66 with attendant rectifying antenna 70, a high-capacity power cable 226, and a vehicle towed embodiment of an electromagnetic railgun 236. The railgun 236 is equipped with a recoil spade 228, capacitor bank 230 in electrical communication with the rectifying antenna 70 via the power cable 226. There is also a traversable turret 232 and ammunition compartment 234. Briefly the MASP beams power down to the rectifying antenna which in turn supplies electricity to charge the capacitor bank 230. When fully charged the capacitor bank 230 discharge by way of the power cable 226 into electromagnets (not shown) that shoot out the projectiles of the railgun 236 stored in ammunition compartment 234. To aim, the railgun need only to rotate or elevate its turret 232.

Railguns are a fairly new form of gun that has been explored for potential use by the military. They operate not on the principles of gas expansion as seen in traditional cannons but on the same principles as a planar electric motor. Railguns use high-powered electromagnets to accelerate conductive metal ammunition to supersonic speeds. The great weight of rail guns and their staggering power requirements have made them heretofore impractical for use except for near large power sources such as onboard nuclear powered naval ships and the like. The MASP would give rail guns the potential to be used on a standard battle field.

FIG. 11

Figure 11:
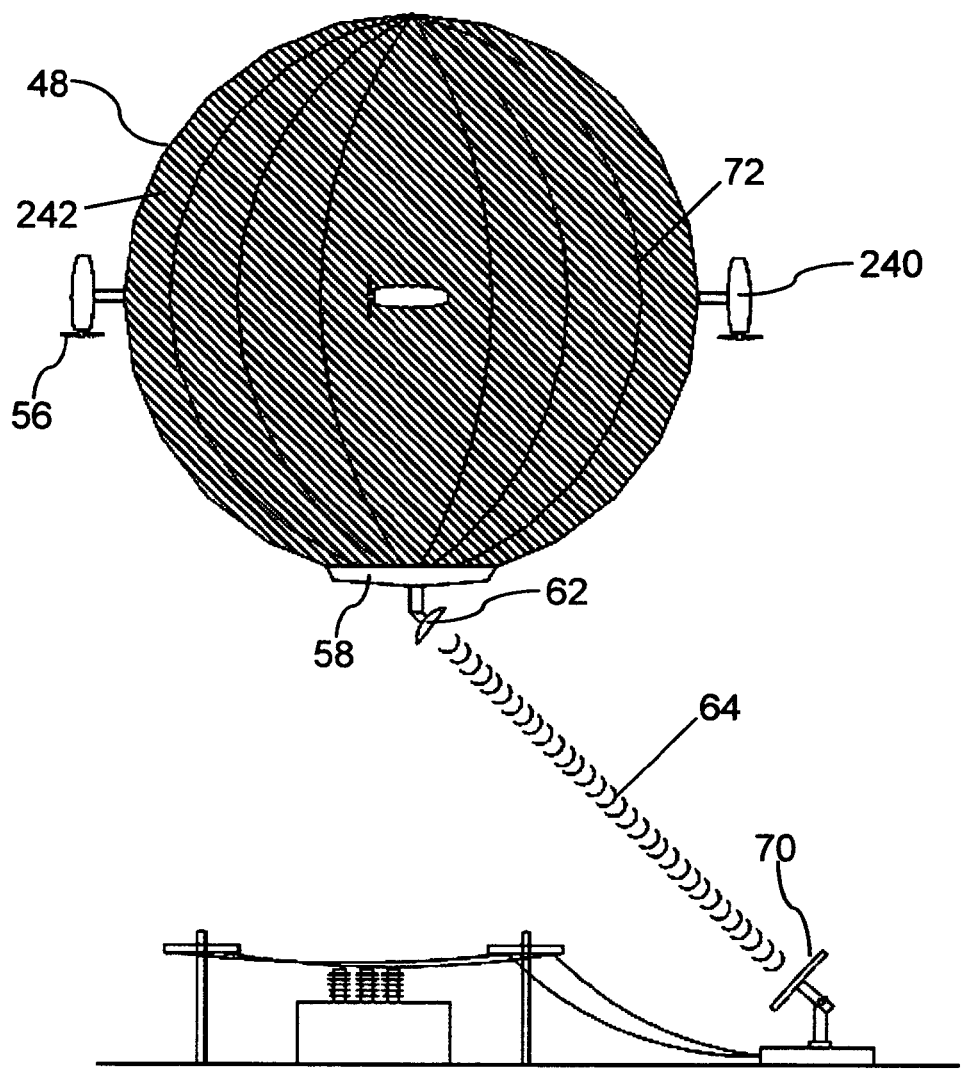
FIG. 11 is a simplified representation of an alternative embodiment of the present invention supplying energy to an electrical substation.

In FIG. 11 we see an alternate embodiment of the MASP where the 20 airship component has been changed to one of spherical geometry. Most of the other components remain the same however. There are thin-film photovoltaics 48 connected to the spherical airship component 238, four propellers 56, a gondola 58, and a directional propagating antenna 62. The collector 22 of the airship 238 is divided up into lune modules 242 that separated from one another by heat sinks 72. The propulsion system 30 is composed of articulated motors 240 with propellers 56. There is on the ground below a rectifying antenna 70 that is using microwaves 64 beamed from the MASP to power an electrical substation.

This figure is meant to demonstrate that the shape or form of the component airship is not relevant to its use as a component for a MASP except insofar as it has sufficient surface area for the collector 22 and the ability to carry a substantial amount of mass.

FIG. 12

Figure 12:
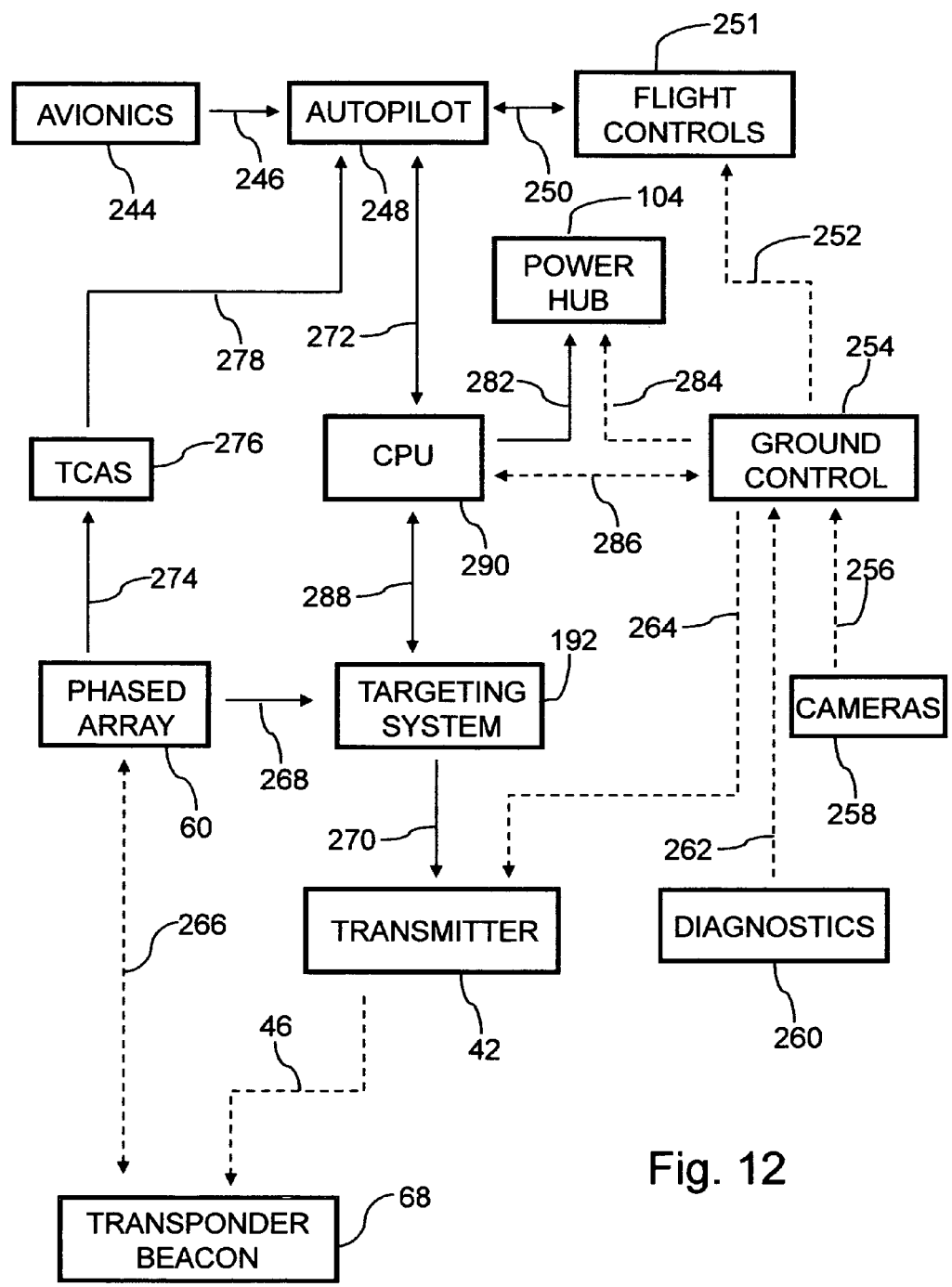
FIG. 12 is a block diagram of the control system for an unmanned embodiment of the present invention.

FIG. 12 outlines a proposed method whereby the MASP can be automated for unmanned operation. Lumped together under avionics 244 we assume the full suite of navigational sensors and communicators such as GPS, weather, lightning detector, ground avoidance, and altimeter (not shown). The avionics 244 feeds the navigation data 246 to the autopilot 248 that manipulates the flight controls 251 via servo-mechanical feedback loops 250. In the event that the phased array radar 60 detects air traffic, it sends an air traffic notification 274 to the traffic collision avoidance system (TCAS) 276 which relays evasive course corrections 278 to the autopilot 248 to avoid midair collisions. The autopilot 248 also exchanges route plans and course updates 272 with a top-level CPU 290. The CPU also maintains a link to the power hub 104 to perform real-time power optimization 282 based on the mission parameters and status update data link 286 it maintains with personnel at ground control 254.

The CPU 290 is likewise connected by a data bus to the targeting system 192 from which it receives power beaming authorization queries 288. Should the phased array radar 60 detect and interrogate a new transponder beacon signal 266, it will send target identification and position data 268 to the targeting system 192 which will query the CPU 290 for power-beaming authorization 288 which will respond based on mission parameters 286 it received from ground control 264. Should the CPU 290 grant authorization for power beaming 288 to the targeting system 192, the targeting system 192 will initiate retrodirective target acquisition 270 with the transmitter 42. The transmitter 42 will then lock onto and fire the electromagnetic beam 46 at the transponder beacon 68.

Should any personnel from ground control 254 monitoring the streaming video feed 256 from the camera 258 directed along the beam path or the diagnostic data feed 262 from the ship-wide diagnostic sensors 260 notice anything amiss, they can initiate manual over-ride of the transmitter 42 via the remote beam targeting link 264 and either shut down or manually fire the electromagnetic beam 68. The personnel at ground control 254 would also be able to take over the flight controls 251 from the autopilot via the remote manual over-ride 252. They would then be able to fly the MASP remotely by watching video feeds from a forward facing camera 258. Ground control can also take control of the power hub 104 using the remote power switching and emergency shut off 284 controls.

CONCLUSION

As we have seen, the mobile aerial sustained solar powerplant is a very useful method and device for collecting, storing, transporting, and wirelessly delivering large amounts of renewable energy. How much energy are we talking about? To give the reader an idea of how much energy this amounts to consider an airship the size of a World War 1 era zeppelin such as the LZ-129. Broadside to the sun at any elevation, it would have the geometrically-transformed equivalent of 7889 square meters of collecting surface.

At 25% conversion efficiency, a similarly-sized MASP could continuously harvest and store about 1.9 megawatts of electricity without accounting for albedo effects. It could move at approximately half speed of 40 miles per hour and still store energy at a rate of a megawatt en-route to a destination.

Once there it could deliver this energy at any power level it wished including in boost mode so for short times, gigawatt levels of power are conceivably deliverable. It could also do all this while carrying 100 metric tons of equipment. This equipment can include such devices as a mobile rectifying antenna that it deployed on site for clients who did not have one of their own. Alternatively it could be a directed energy weapon onboard the MASP such as an EMP generator as shown or free-electron laser that could fire gigawatt levels of electromagnetic energy at hostile forces at a tunable wavelength that ranged from microwaves to visible light to x-rays.

All this is possible because of the unique energy storage system of the MASP. The storage system eliminates the disadvantages inherent in the prior art. Because of this very flexible storage system numerous embodiments of the MASP are imaginable and practicable. In light of this the reader should not interpret the specifics that I have communicated as limitations to the scope of this invention. Instead I would ask the reader to interpret them merely as some personally preferred embodiments thereof. Accordingly the scope of this invention should not be determined by the embodiments illustrated but by the appended claims and the legal equivalents thereof.

I claim:

1. A method for using an airship to collect and wirelessly deliver renewable solar energy in a sustained, buffered, and controlled manner to any location at any time of day or night, the method comprising the steps of:
    providing a navigable motorized airship, said airship comprising at least one gas envelope for containing a buoyant lifting gas and a fuel, wherein the buoyant lifting gas and the fuel comprise hydrogen gas;
    providing a collection means, contiguous with said airship, configured to gather solar radiation and capable of generating a first electricity from said solar radiation;
    providing a storage means, contiguous with said airship, wherein said storage means comprises:
    at least one water reservoir configured to store water;
    at least one electrolytic cell configured to produce a hydrogen fuel from said stored water by application of said first electricity generated by said collection means;
    at least one hydrogen compressor configured to compress said hydrogen fuel;
    at least one reservoir configured to store said hydrogen fuel, said at least one reservoir selected from the group consisting of said at least one gas envelope, at least one pressurized hydrogen container, and a combination of at least one gas envelope and at least one pressurized hydrogen container; and
    at least one fuel cell stack configured to generate a second electricity and heat from said hydrogen fuel drawn from said at least one reservoir;
    collecting said solar radiation with said collection means during conditions where solar radiation is sufficient to enable generating said first electricity;
    storing said electricity with said storage means during conditions where solar radiation is sufficient to enable generating said first electricity;
    flying said airship to a destination where said first or second electricity are to be delivered,
    retrieving said second electricity from said storage means at any time;
    providing at least one transmission means, contiguous with said airship, configured to directionally emit an electromagnetic beam using said first or second electricity,
    providing a targeting means for aiming said transmission means;
    providing a target, remote from said airship and at said destination, to which said first or second electricity is delivered;

directing said electromagnetic beam at said target using said transmission means, wherein directing said electromagnetic beam enables a substantial amount of renewable energy to be delivered to said target regardless of the time of day, cloud cover, or other atmospheric conditions; and providing at least one switching means contiguous with said airship, wherein said at least one switching means is configured to controllably allocate said first or second electricity throughout said airship, and wherein said at least one switching means is further configured to enable a boost mode whereby the step of directing said electromagnetic beam uses both said first electricity and said second electricity in a temporary augmentation of the renewable energy delivered to said target.

2. An apparatus comprising a mobile aerial sustained solar power-plant capable of collecting, storing, transporting and delivering renewable solar energy wirelessly to a remote location in a metered and controllable manner, the mobile aerial sustained solar power-plant comprising:

a self-propelled navigable airship;

at least one gas envelope capable of containing hydrogen for use as a buoyant lifting gas and for use as a fuel;

a propulsion system configured to move said airship;

a collection means contiguous with said airship configured to collect solar radiation and configured to convert said solar radiation into a first electricity;

a storage means contiguous with said airship capable of storing said first electricity in a readily retrievable form, wherein said storage means further comprises:

a water reservoir configured to contain water for use as a source of a hydrogen fuel;

an electrolytic cell configured to use said first electricity generated by said collection means to electrolyze said water into said hydrogen fuel and oxygen;

at least one hydrogen compressor to compress said hydrogen fuel; and at least one reservoir capable of storing said hydrogen fuel, said at least one reservoir selected from the group consisting of said at least one gas envelope, a high-pressure hydrogen container, and a combination of at least one gas envelope and at least one pressurized hydrogen container;

at least one fuel cell stack configured to retrieve a second electricity and heat from said stored hydrogen fuel;

at least one switching means configured to adjustably route said first and second electricity between said collection means, said storage means, and other components of said mobile aerial sustained solar power-plant;

at least one transmission means electrically connected to said switching means, said at least one transmission means comprising an electromagnetic beam emitter powered by said first or second electricity; and a targeting means for aiming said transmission means at a target in order to avoid damaging any objects that are not said target; and wherein said at least one switching means is further configured to enable a boost mode capable of providing a temporary augmentation of the renewable solar energy delivered to said target by said electromagnetic beam emitter by using both said first electricity and said second electricity to power said electromagnetic beam emitter, whereby renewable solar energy in the form of said first and second electricity may be stored, recovered and delivered in a buffered fashion by said apparatus.

3. The method of claim 1, wherein said transmission means further comprises an electromagnetic beam having a frequency of approximately 95 GHz.

4. The apparatus of claim 2, wherein said collection means is substantially disposed upon all surfaces of said airship including the top, sides, and the bottom of said airship, in order to maximize collection of solar radiation from albedo, reflected, and diffuse sunlight sources of said solar radiation.

5. The apparatus of claim 2, wherein said switching means further comprises a digital computer programmed to manage collection, storage and distribution of said electricity.

* * * * *